United States Patent
Vajapeyam et al.

(10) Patent No.: US 10,681,766 B2
(45) Date of Patent: *Jun. 9, 2020

(54) PROCEDURES FOR MANAGING SECONDARY ENB (SENB) RADIO LINK FAILURE (S-RLF) IN DUAL CONNECTIVITY SCENARIOS

(71) Applicant: QUALCOMM Incorporated, San Diego, CA (US)

(72) Inventors: Madhavan Srinivasan Vajapeyam, San Diego, CA (US); Gavin Bernard Horn, La Jolla, CA (US); Jelena Damnjanovic, Del Mar, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,116

(22) Filed: May 17, 2019

(65) Prior Publication Data

US 2019/0274179 A1    Sep. 5, 2019

Related U.S. Application Data

(63) Continuation of application No. 14/608,688, filed on Jan. 29, 2015, now Pat. No. 10,306,695.

(Continued)

(51) Int. Cl.
*H04W 76/18* (2018.01)
*H04W 76/19* (2018.01)

(Continued)

(52) U.S. Cl.
CPC .......... *H04W 76/18* (2018.02); *H04L 1/1887* (2013.01); *H04L 1/20* (2013.01); *H04W 24/04* (2013.01);

(Continued)

(58) Field of Classification Search
CPC ......... H04W 36/0005; H04W 36/0016; H04W 36/24
See application file for complete search history.

(56) References Cited

U.S. PATENT DOCUMENTS

| | | |
|---|---|---|
| 2012/0002554 A1 | 1/2012 | Ishii et al. |
| 2012/0281548 A1 | 11/2012 | Lin et al. |

(Continued)

FOREIGN PATENT DOCUMENTS

| | | |
|---|---|---|
| CN | 101998431 A | 3/2011 |
| CN | 102870450 A | 1/2013 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12) ", 3GPP Standard; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V12.0.0, Jan. 7, 2014 (Jan. 7, 2014), pp. 1-349, XP050729407, [retrieved on Jan. 7, 2014].

(Continued)

*Primary Examiner* — Christopher M Crutchfield
(74) *Attorney, Agent, or Firm* — Patterson & Sheridan, LLP

(57) ABSTRACT

Certain aspects of the present disclosure provide procedures for managing secondary eNB (SeNB) radio link failure (S-RLF) in dual connectivity scenarios. A user equipment (Continued)

(UE) may establish communication with a Master Evolved Node B (MeNB) and a Secondary eNB (SeNB). The UE may detect a Radio Link Failure (RLF) of a connection with the SeNB and may transmit an indication of the RLF to the MeNB, in response to the detection. The MeNB may take at least one action to manage the RLF, in response to receiving the indication of the RLF, for example, including transmitting a reconfiguration command to the UE. The SeNB may also detect the RLF and transmit an indication of the RLF to the MeNB over a backhaul connection, in response to the detection.

30 Claims, 14 Drawing Sheets

Related U.S. Application Data

(60) Provisional application No. 61/934,258, filed on Jan. 31, 2014.

(51) Int. Cl.
*H04W 24/04* (2009.01)
*H04W 36/08* (2009.01)
*H04W 36/30* (2009.01)
*H04L 1/20* (2006.01)
*H04L 1/18* (2006.01)
*H04L 1/00* (2006.01)
*H04W 76/15* (2018.01)

(52) U.S. Cl.
CPC .......... *H04W 36/08* (2013.01); *H04W 36/30* (2013.01); *H04W 76/19* (2018.02); *H04L 2001/0092* (2013.01); *H04W 76/15* (2018.02)

(56) References Cited

U.S. PATENT DOCUMENTS

| | | |
|---|---|---|
| 2014/0086112 A1 | 3/2014 | Stern-Berkowitz et al. |
| 2015/0133122 A1 | 5/2015 | Chen |
| 2015/0146562 A1 | 5/2015 | Sivanesan et al. |
| 2015/0181953 A1 | 7/2015 | Brown |
| 2015/0223282 A1 | 8/2015 | Vajapeyam et al. |
| 2015/0365872 A1 | 12/2015 | Dudda et al. |
| 2016/0277987 A1 | 9/2016 | Chen et al. |
| 2018/0160450 A1 | 6/2018 | Sivanesan et al. |

FOREIGN PATENT DOCUMENTS

| | | |
|---|---|---|
| GB | 2519975 A | 5/2015 |
| WO | WO-2010104334 A2 | 9/2010 |
| WO | WO-2012139798 A1 | 10/2012 |
| WO | WO-2013009892 A1 | 1/2013 |
| WO | WO-2014163082 A1 | 10/2014 |
| WO | WO-2015022986 A1 | 2/2015 |

OTHER PUBLICATIONS

Catt, Catr: "RLM Considerations on the Special Cell of SCG", 3GPP TSG-RAN WG2#85, R2-140180, Jan. 9, 2014, 4 Pages, Internet URL: http://www.3gpp.org/ftp/tsg_ran/WG2_RL2/TSGR2_85/Docs/R2-140180.zip.
Catt, et al., "RLM considerations for dual connectivity", 3GPP DRAFT; R2-134053, 3rd Generation Partnership Project (3GPP), Mobile Competence Centre; 650, Route Des Lucioles; F-06921 Sophia-Antipolis Cedex; France, vol. RAN WG2, No. San Francisco, USA, Nov. 13, 2013 (Nov. 13, 2013), XP050736857, Retrieved from the Internet: URL:http://www.3gpp.org/ftp/meetings_3GPP/SYNC/RAN/RAN2/Docs/ [retrieved on Nov. 13, 2013].
Chen., et al., "GB Foreign Patent Application No. 1319382.6,".
Intel Corporation: "Radio link failure handling for dual connectivity", 3GPP TSG RAN WG2 Meeting #83, R2-132819, Aug. 23, 2013, pp. 1-4.
Intel Corporation: "Radio link failure handling for dual connectivity", 3GPP DRAFT; R2-134271, 3rd Generation Partnership Project (3GPP), Mobile Competence Centre; 650, Route Des Lucioles; F-06921 Sophia-Antipolis Cedex; France, vol. Ran WG2, No. San Francisco, USA; 20131111-20131115, Nov. 13, 2013 (Nov. 13, 2013), XP050737010, Retrieved from the Internet: URL:http://www.3gpp.org/ftp/Meetings_3GPP_SYNC/RAN/RAN2/Docs/ [retrieved on Nov. 13, 2013].
International Search Report and Written Opinion—PCT/US2015/013638—ISA/EPO—dated Apr. 15, 2015.
Kyocera: "RLF issues in inter-eNB CA", 3GPP DRAFT; R2-134317_Inter-eNB CA, 3RD Generation Partnership Project (3GPP), Mobile Competence Centre; 650, Route Des Lucioles ; F-06921 Sophia-Antipolis Cedex; France, vol. RAN WG2, No. San Francisco; 20131111-20131115, Nov. 13, 2013 (Nov. 13, 2013), XP050737042, Retrieved from the Internet: URL:http://www.3gpp.org/ftp/Meetings_3GPP_SYNC/RAN/RAN2/Docs/ [retrieved on Nov. 13, 2013].

PROCEDURES FOR MANAGING SECONDARY ENB (SENB) RADIO LINK FAILURE (S-RLF) IN DUAL CONNECTIVITY SCENARIOS

CROSS-REFERENCE TO RELATED APPLICATIONS

The present application for patent is a continuation of U.S. patent application Ser. No. 14/608,688 by Vajapeyam et al., filed Jan. 29, 2015, which claims priority to U.S. Provisional Application No. 61/934,258, filed Jan. 31, 2014, which are assigned to the assignee of the present application and expressly incorporated by reference herein in its entirety.

FIELD

The present disclosure relates generally to managing secondary eNB (SeNB) radio link failure (S-RLF) in dual connectivity scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide an apparatus for wireless communications implemented, for example, by User Equipment (UE). The apparatus generally includes at least one processor and a memory coupled to the at least one processor. The at least one processor is generally configured to establish communication with a Master Evolved Node B (MeNB) and a Secondary eNB (SeNB), detect a Radio Link Failure (RLF) of a connection with the SeNB, and transmit an indication of the RLF to the MeNB, in response to the detection.

Certain aspects of the present disclosure provide an apparatus for wireless communications implemented, for example, by a Master enodeB (MeNB). The apparatus generally includes at least one processor and a memory coupled to the at least one processor. The at least one processor is generally configured to establish a first connection with a User Equipment (UE), configure the UE to establish a second connection with a Secondary Evolved Node B (SeNB), receive an indication of a Radio Link Failure (RLF) of the second connection, and take at least one action to manage the RLF, in response to receiving the indication of the RLF, where one action may be reconfiguring the UE.

Certain aspects of the present disclosure provide an apparatus for wireless communications implemented, for example, by Secondary eNodeB (SeNB). The apparatus generally includes at least one processor and a memory coupled to the at least one processor. The at least one processor is generally configured to establish communication with a Master Evolved Node B (MeNB) and a User Equipment (UE), detect a Radio Link Failure (RLF) of a connection with the UE, and transmit an indication of the RLF to the MeNB over a backhaul connection, in response to the detection.

Aspects of the present disclosure also provide various other apparatuses and program products capable of performing operations described below.

DETAILED DESCRIPTION

Figure 1:
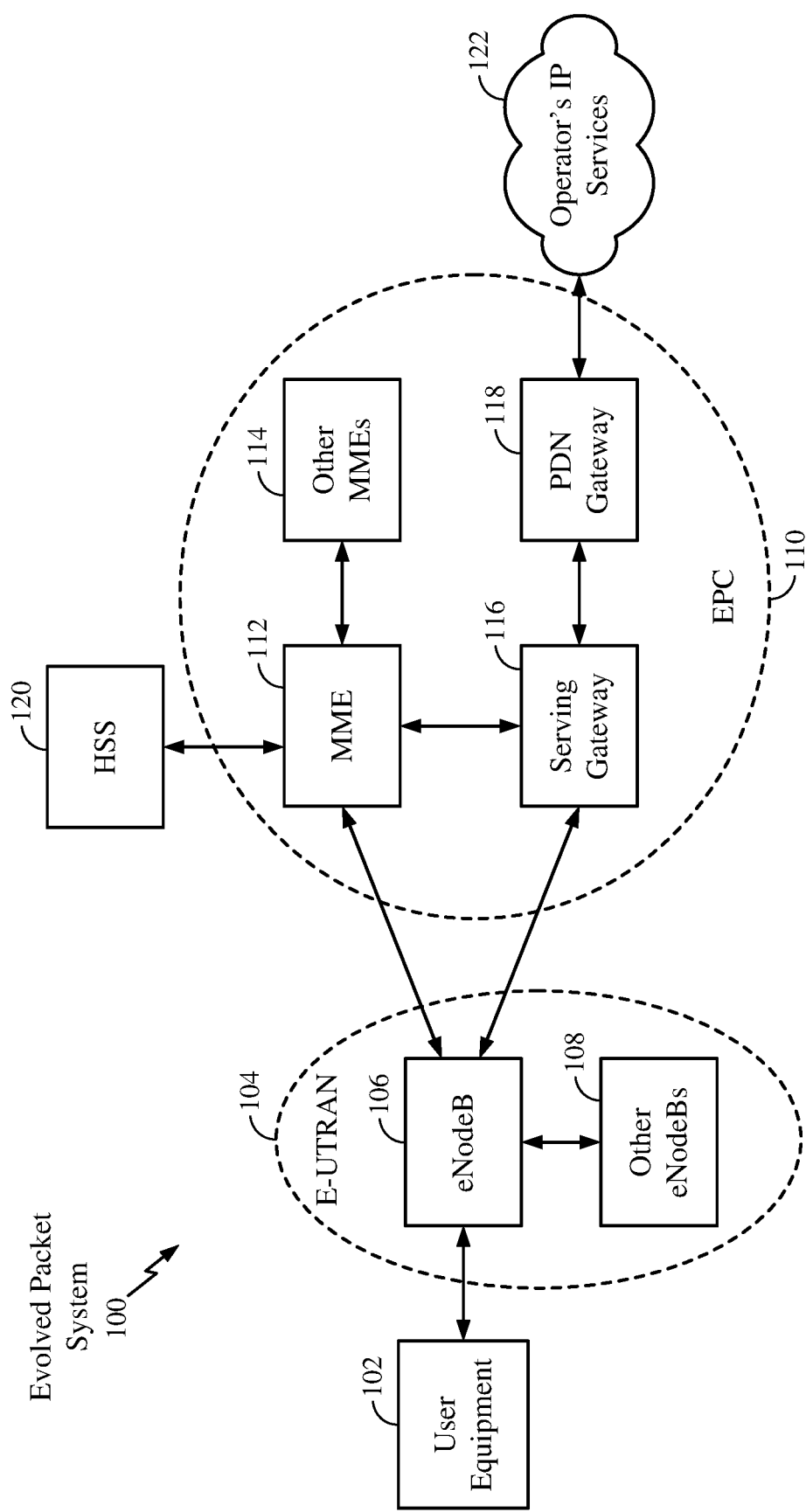
FIG. 1 is a diagram illustrating an example of a network architecture.

Presently, UEs receive data from one eNodeB. However, users on a cell edge may experience high inter-cell interference which may limit the data rates. Dual connectivity allows users to communicate with two eNodeBs simultaneously by sending and receiving data from the two eNodeBs in two totally separate streams. By scheduling two independent data streams to the UE from the two different eNodeBs at the same time, dual connectivity exploits uneven loading.

In an aspect of the present disclosure, dual connectivity enables a UE to simultaneously connect to a Master eNB (MeNB) and a secondary eNB (SeNB) which may not be collocated and, thus, may be connected by a non-ideal backhaul. Under dual connectivity a UE may benefit from carrier-aggregation (CA) gains in heterogeneous deployments.

In certain aspects, due to the distributed nature of the dual connectivity deployment scenario (e.g., separate eNBs connected via a non-ideal backhaul) separate uplink control channels for both eNBs (MeNB and SeNB) is used to support distributed scheduling and independent MAC (Medium Access Control) operation across the eNBs. In an aspect, a special cell on the SeNB, Primary Secondary Cell (SpCell), is introduced in order to support the uplink control channels for the SeNB. The presence of an uplink control channel for the SeNB motivates the need for a special radio link failure (RLF) procedure for the SeNB. This special RLF procedure for the SeNB may be referred to as the S-RLF.

According to certain aspects of the present disclosure, an S-RLF procedure may include a UE detecting RLF of a connection with the SeNB and transmitting an indication of the RLF to the MeNB, in response to the detection. The MeNB may take at least one action to manage the RLF, in response to receiving the indication of the RLF, for example, by transmitting a reconfiguration command to the UE. In an aspect, SeNB may also detect the RLF and transmit an indication of the RLF to the MeNB over a backhaul connection, in response to the detection.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, as indicated above, a UE (e.g. UE 102) may be dually connected to a MeNB (e.g., eNodeB 106) and a SeNB (one of the other eNBs 108) simultaneously. In an aspect, once UE 102 is connected to the MeNB 106, the MeNB 106 may configure the UE to establish connection with the SeNB 108, including transmitting configuration parameters to the UE 102 regarding S-RLF. In an aspect, the MeNB 106 and the SeNB 108 may be connected by a non-ideal backhaul. As noted above, an S-RLF procedure for the SeNB 108 may include S-RLF detection, S-RLF indication, and at least one of S-RLF recovery or SeNB release including bearer fallback upon S-RLF. In certain aspects, the UE 102 may detect RLF of a connection with the SeNB 108 (S-RLF) and transmit an indication of the S-RLF to the MeNB 106. In an aspect, in response to detecting the S-RLF, the UE may also suspend communication with the SeNB to prevent uplink interference with uplink transmission of other UEs in the vicinity of UE 102. In an aspect the UE 102 may provide the indication of the S-RLF to the MeNB 106 by transmitting a Radio Link Control (RRC) message to the MeNB 106. Upon receiving the indication of S-RLF from the UE 102, MeNB 106 may take at least one action to manage the S-RLF, including transmitting a reconfiguration command to the UE. In an aspect, the reconfiguration command may include at least one of SeNB release, SeNB add (for adding another SeNB), SeNB modify (e.g., modify transmit power), or data fallback. In certain aspects, the SeNB 108 may also detect RLF of a connection with the UE 102 and may transmit an indication of the RLF to the MeNB 106 over the backhaul connection, in response to the detection.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The S1 bearer connects an eNB to the core network. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
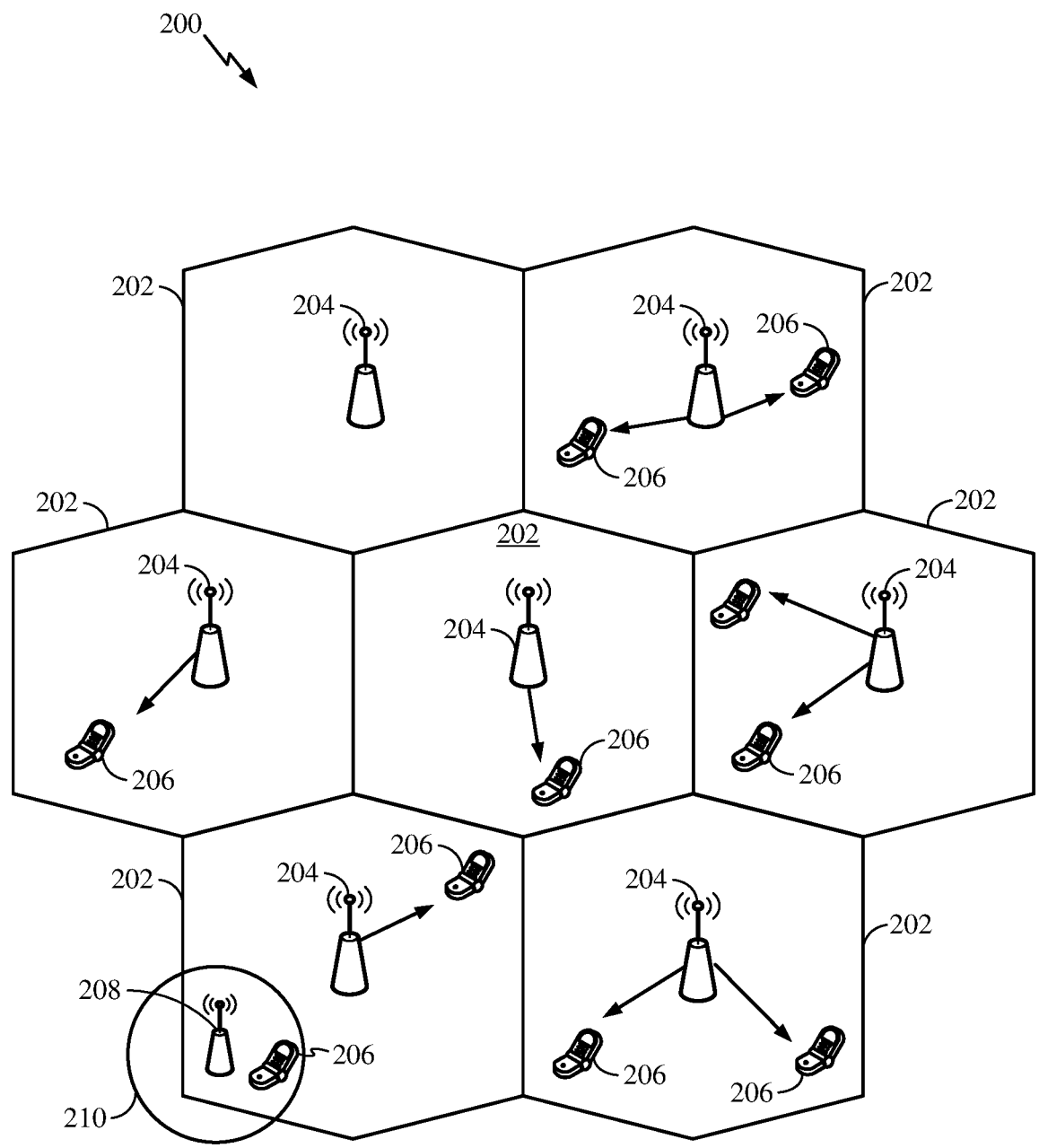
FIG. 2 is a diagram illustrating an example of an access network.

FIG. 2 is a diagram illustrating an example of an access network 200 in an LTE network architecture in which aspects of the present disclosure may be practiced.

Figure 3:
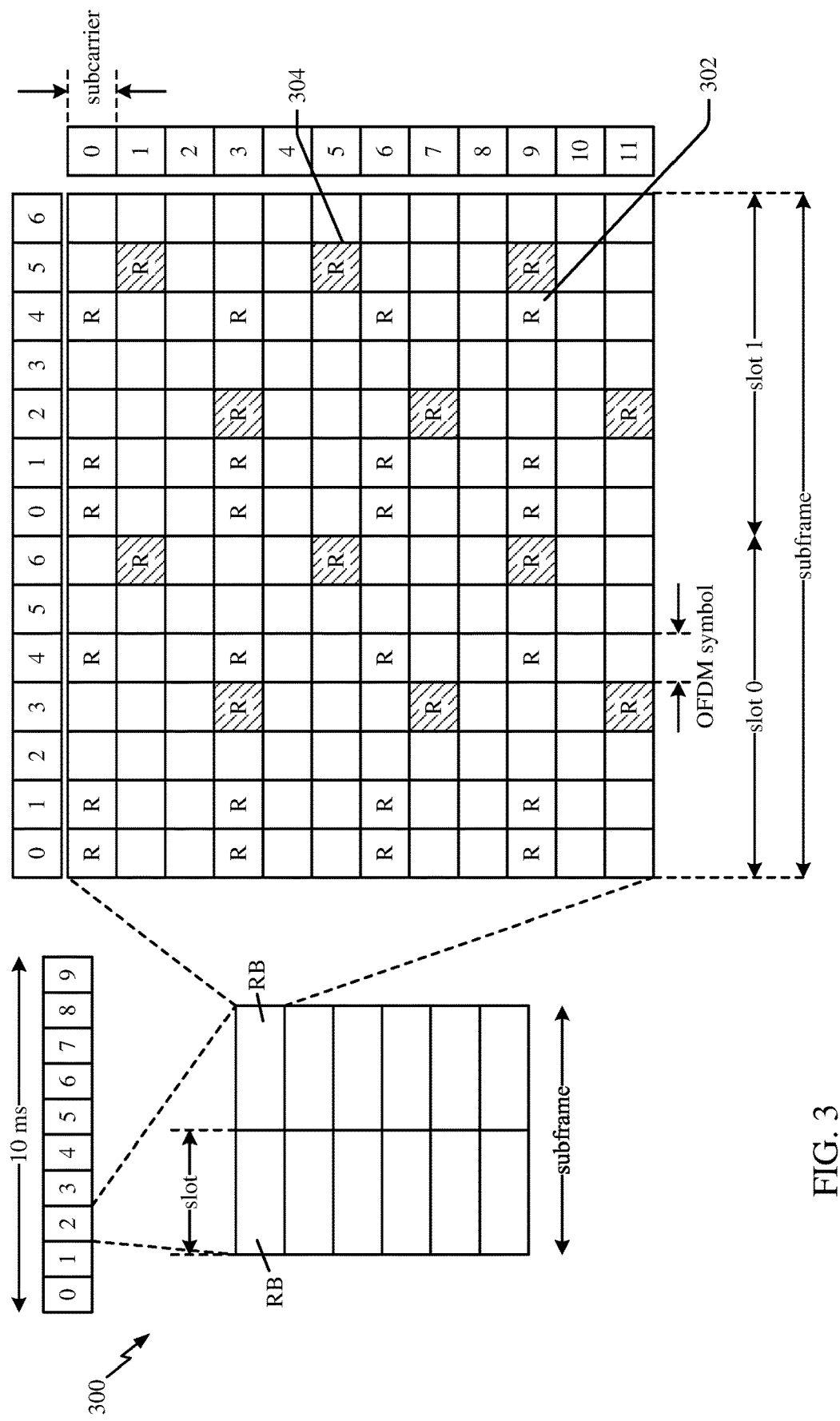
FIG. 3 is a diagram illustrating an example of a DL frame structure in LTE.

In certain cases, a UE 206 that is at the cell edge of a cell 202 may not efficiently communicate on the UL with its serving eNB 204 due to power limitations, UL interference etc. As shown in FIG. 3, UE 206 may be at overlapping cell edges of cell 202 served by macro eNB 204 (e.g., MeNB) and cell 210 served by a lower power class eNB 208 (e.g., SeNB), and may be dually connected to both eNB 204 and eNB 208 simultaneously. In an aspect, eNB 204 and eNB 208 may be connected by a non-ideal backhaul. In certain aspect, UE 206 may detect RLF of a connection with the eNB 208 (S-RLF) and indicate the S-RLF to the eNB 204, for example, by transmitting a RRC message. Concurrently, the UE 206 may also suspend all communication with eNB 208 to prevent uplink interference with uplink transmission of other UEs in the vicinity of UE 206. Upon receiving the indication of S-RLF from the UE 206, eNB 204 may take at least one action to manage the S-RLF, including transmitting a reconfiguration command to the UE 206. In certain aspects, the eNB 208 may also detect RLF of a connection with the UE 206 and may transmit an indication of the RLF to the eNB 204 over the backhaul connection, in response to the detection.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows for some examples, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
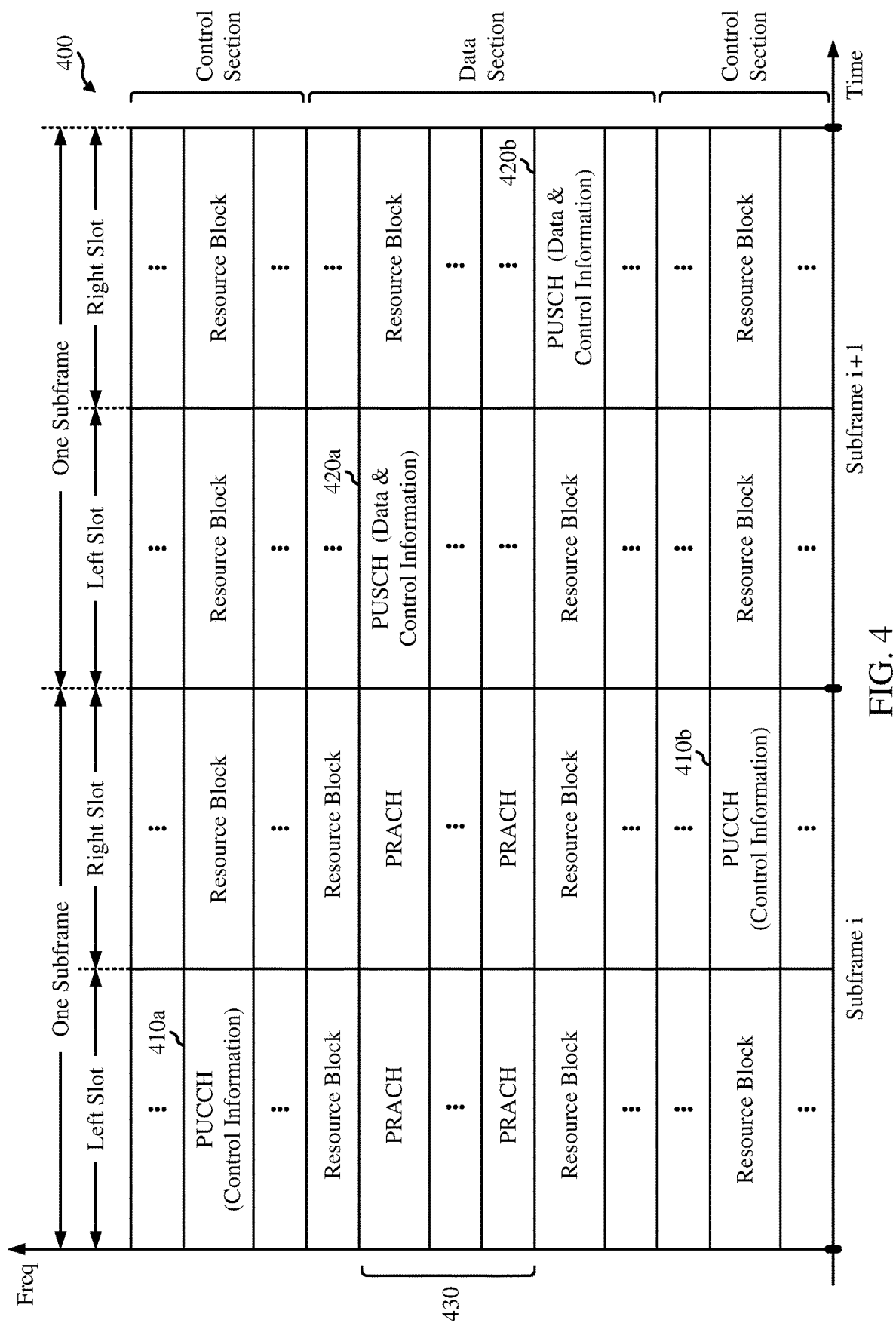
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
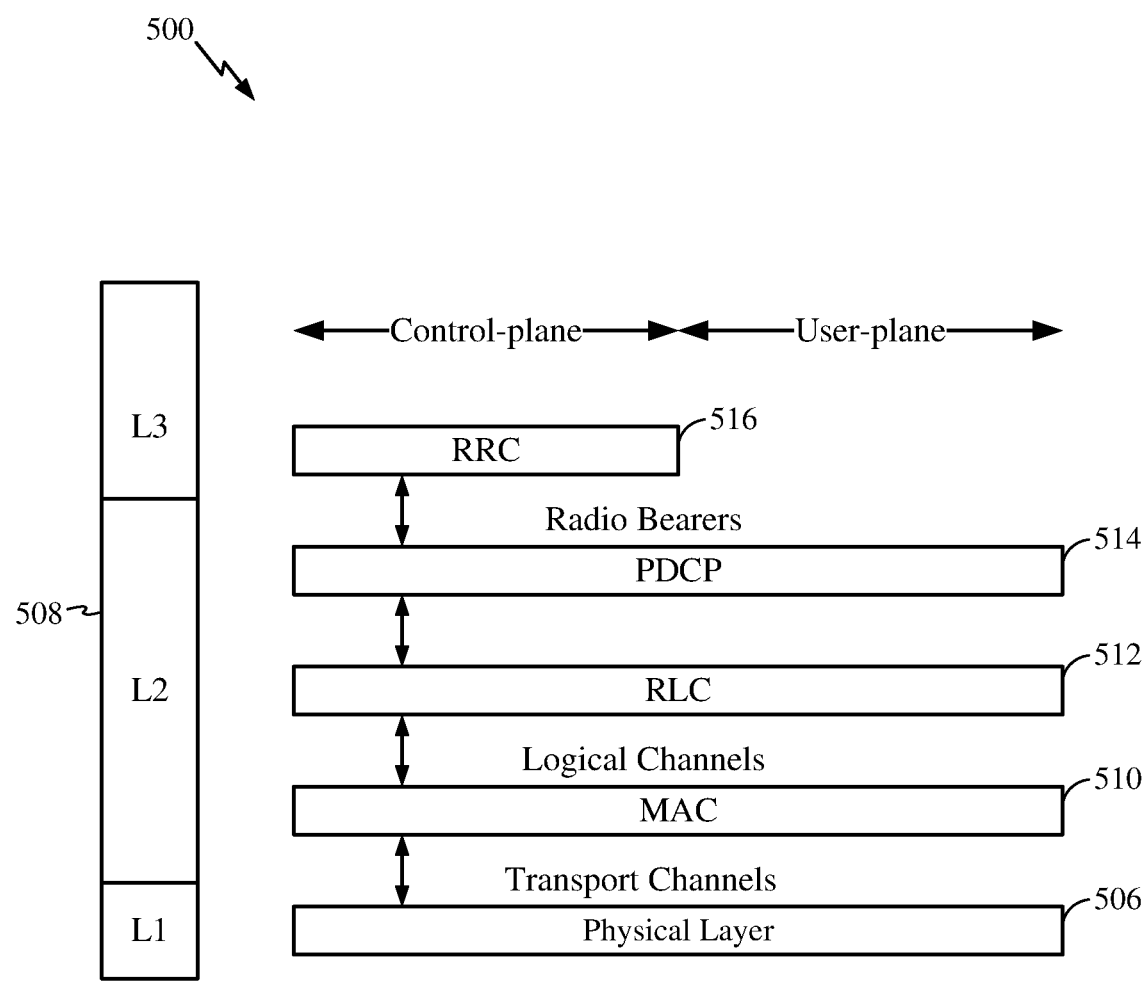
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
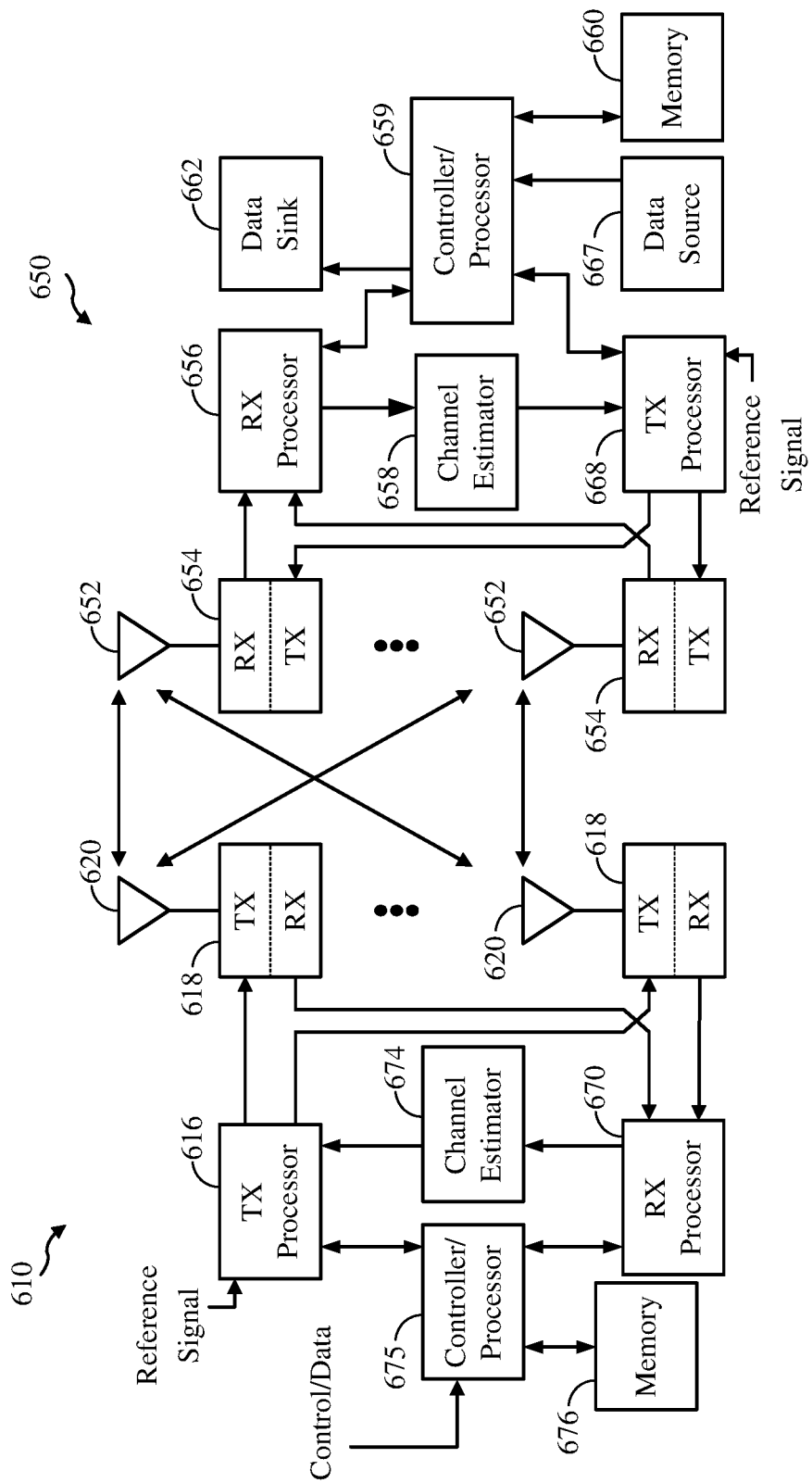
FIG. 6 is a diagram illustrating an example of an evolved Node B and user equipment in an access network.

FIG. 6 is a block diagram of an eNB 610 in communication with a UE 650 in an access network, in which aspects of the present disclosure may be practiced.

For example, a UE (e.g. UE 650) may be dually connected to a MeNB (e.g., eNodeB 610) and another SeNB (not shown) simultaneously. The MeNB 610 and the SeNB may be connected by a non-ideal backhaul. In certain aspects, the UE 650 may detect RLF of a connection with the SeNB (S-RLF) and transmit an indication of the S-RLF to the MeNB 610. Additionally, in response to detecting the S-RLF, the UE 650 may suspend all communication with the SeNB. Upon receiving the indication of S-RLF from the UE 650, MeNB 610 may take at least one action to manage the S-RLF, including transmitting a reconfiguration command to the UE 650. In an aspect, the reconfiguration command may include at least one of SeNB release, SeNB add (for adding another SeNB), SeNB modify (e.g., modify transmit power), or data fallback. In certain aspects, the SeNB also may detect RLF of a connection with the UE 650 and may transmit an indication of the RLF to the MeNB 610 over the backhaul connection, in response to the detection.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and de-interleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Figure 11:
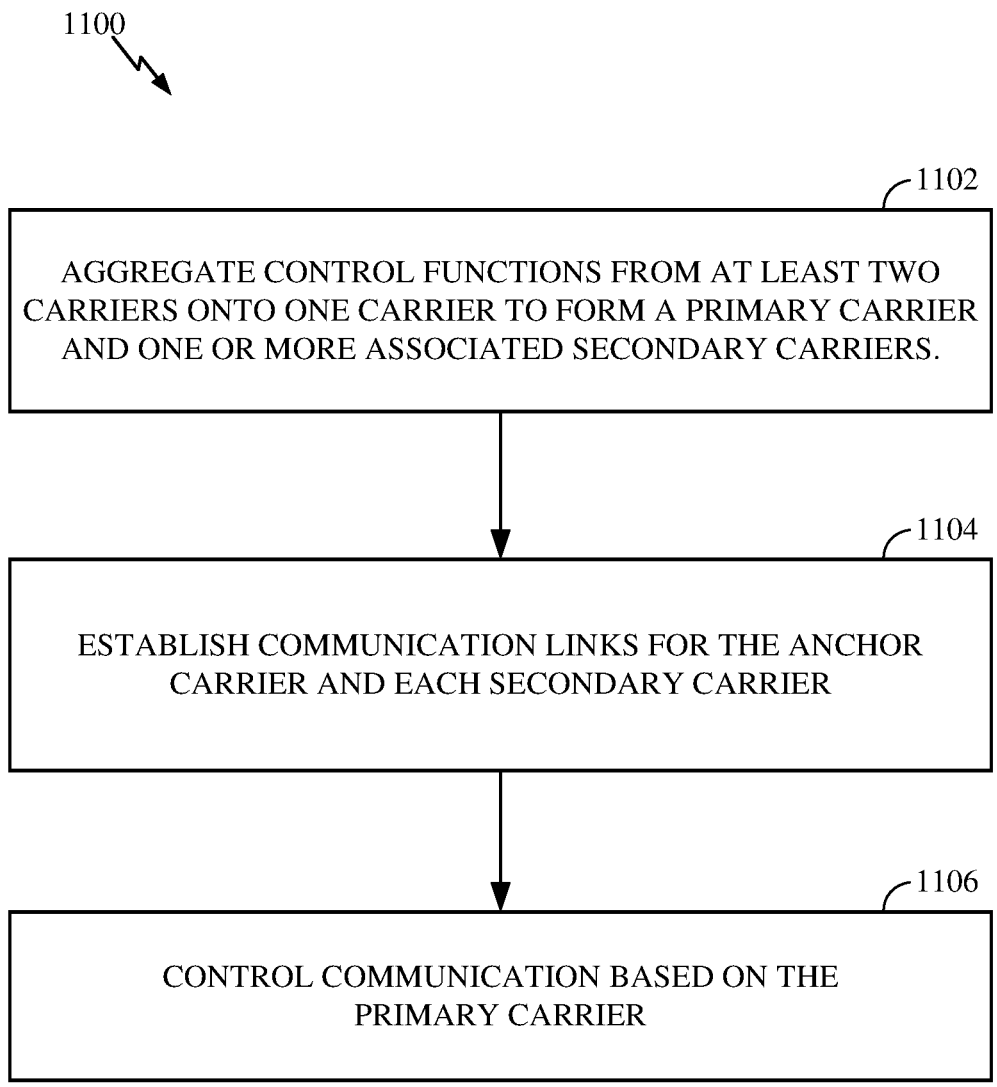
FIG. 11 illustrates a method for controlling radio links in a multiple carrier wireless communication system by grouping physical channels, in accordance with certain aspects of the present disclosure.
Figure 14:
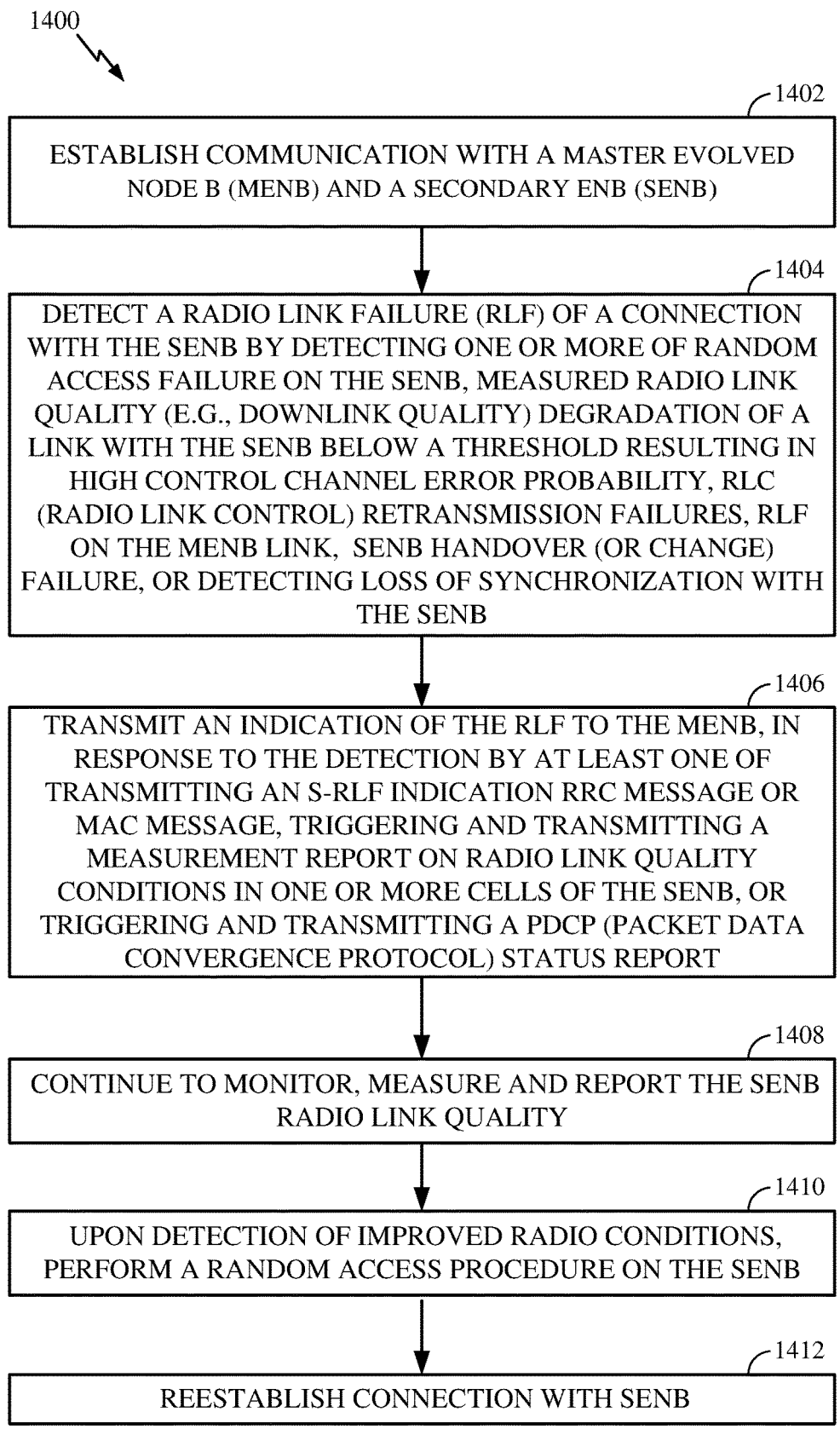
FIG. 14 illustrates example operations performed, for example, by a UE, in accordance with certain aspects of the present disclosure.
Figure 15:
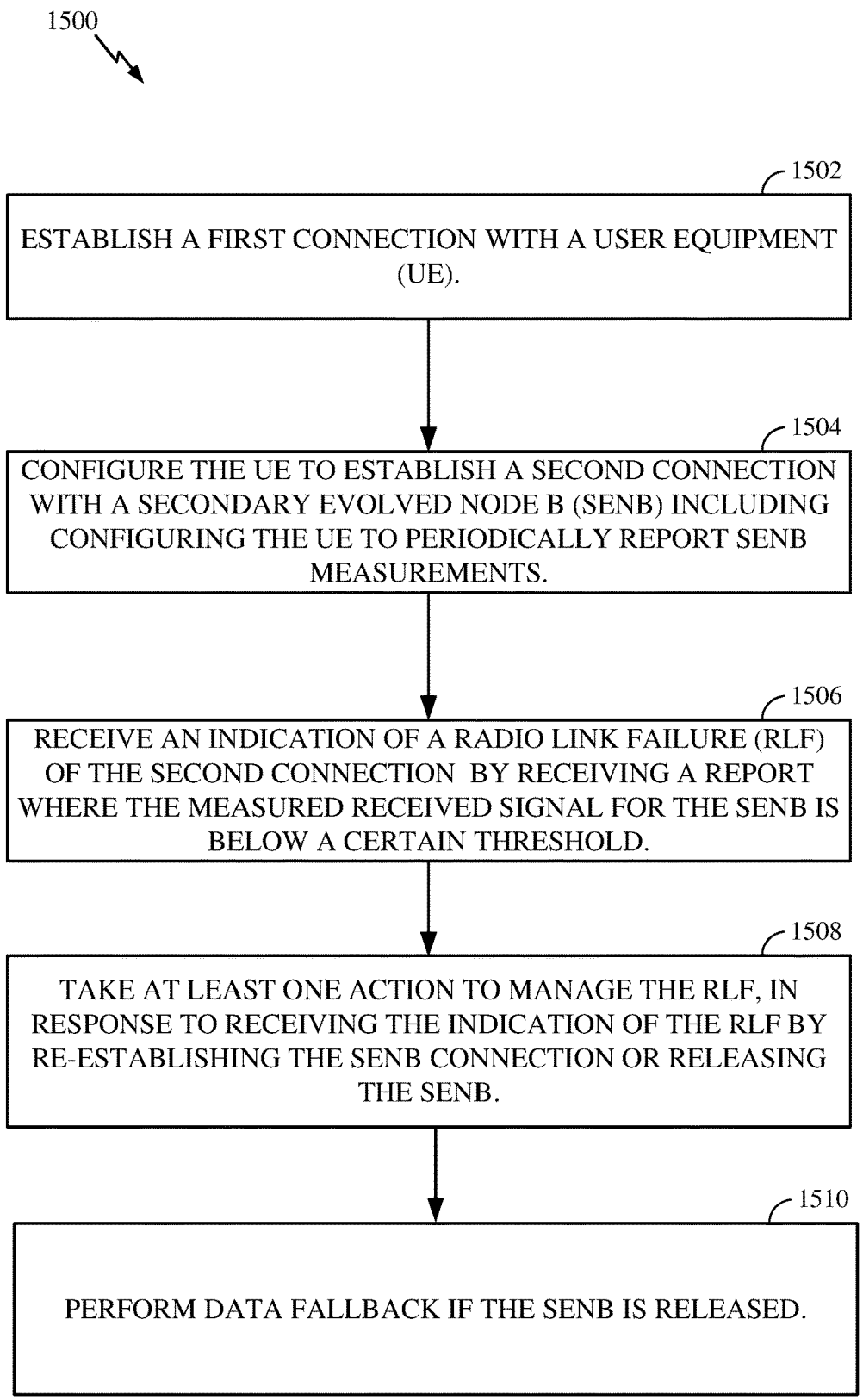
FIG. 15 illustrates example operations performed, for example, by a MeNB, in accordance with certain aspects of the present disclosure.
Figure 16:
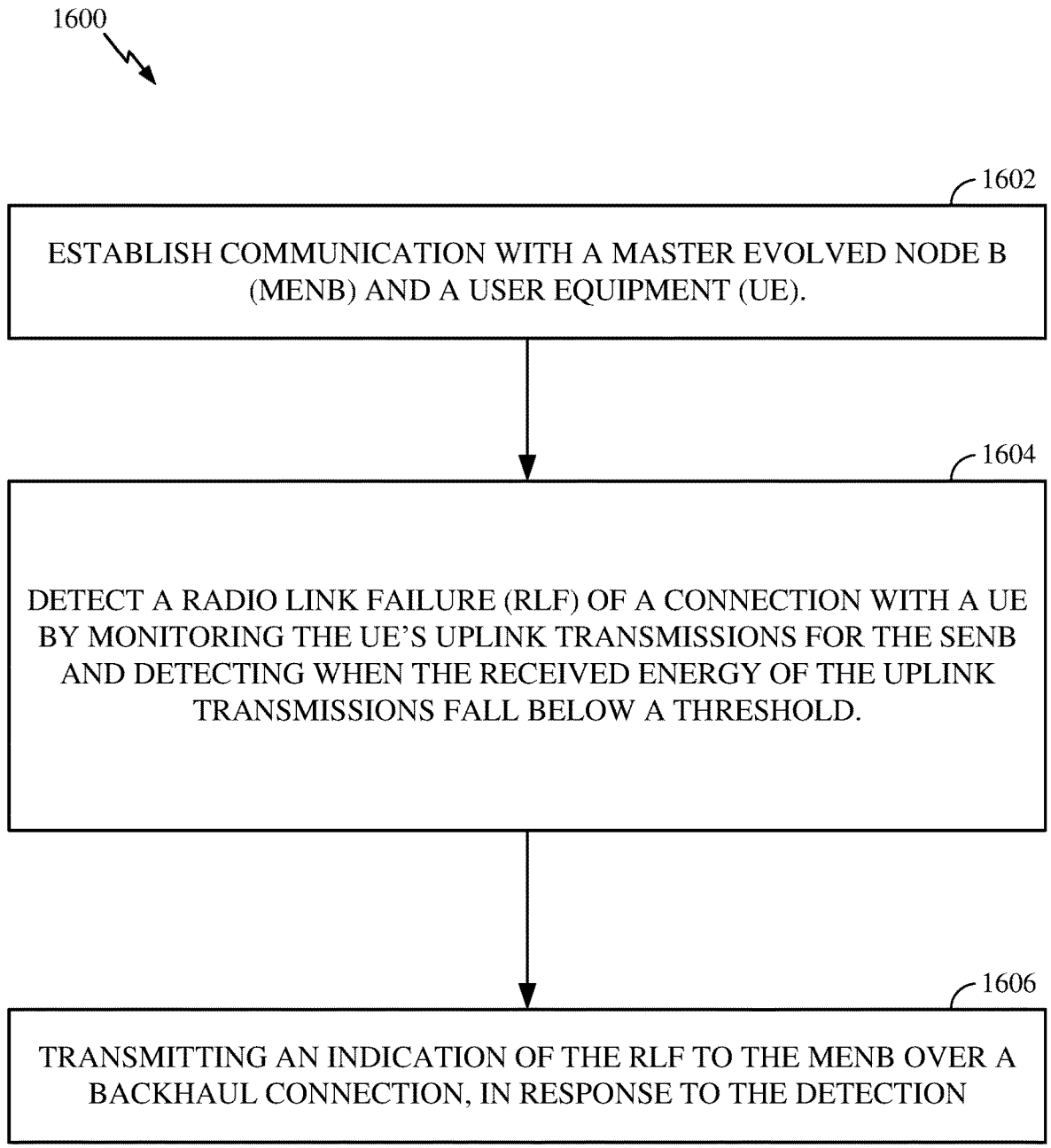
FIG. 16 illustrates example operations performed, for example, by a SeNB, in accordance with certain aspects of the present disclosure.

The controller/processor 675 and/or other processors and modules at the eNB 610 may perform or direct operations, for example, operations 1100 in FIG. 11, operations 1500 in FIG. 15, operations 1600 in FIG. 16 and/or other processes for the techniques described herein for S-RLF management. The controller/processor 659 and/or other processors and modules at the UE 650 may perform or direct operations, for example, operations 1400 in FIG. 14, and/or other processes for the techniques described herein S-RLF management. In certain aspects, one or more of any of the components shown in FIG. 6 may be employed to perform example operations 1100, 1400, 1500, 1600 and/or other processes for the techniques described herein. The memories 660 and 676 may store data and program codes for the UE 650 and eNB 610 respectively, accessible and executable by one or more other components of the UE 650 and the eNB 610.

Example Procedures for Managing Secondary eNB (SeNB) Radio Link Failure (S-RLF) in Dual Connectivity Scenarios Presently, UEs receive data from one eNodeB. However, users on a cell edge may experience high inter-cell interference which may limit the data rates. Dual connectivity allows users to communicate with two eNodeBs simultaneously. It works by sending and receiving data from the two eNodeBs in two totally separate streams when a UE is in range of two cell towers in two adjacent cells at the same time. The UE talks to the two towers simultaneously when it is on the edge of either towers' reach.

Figure 7:
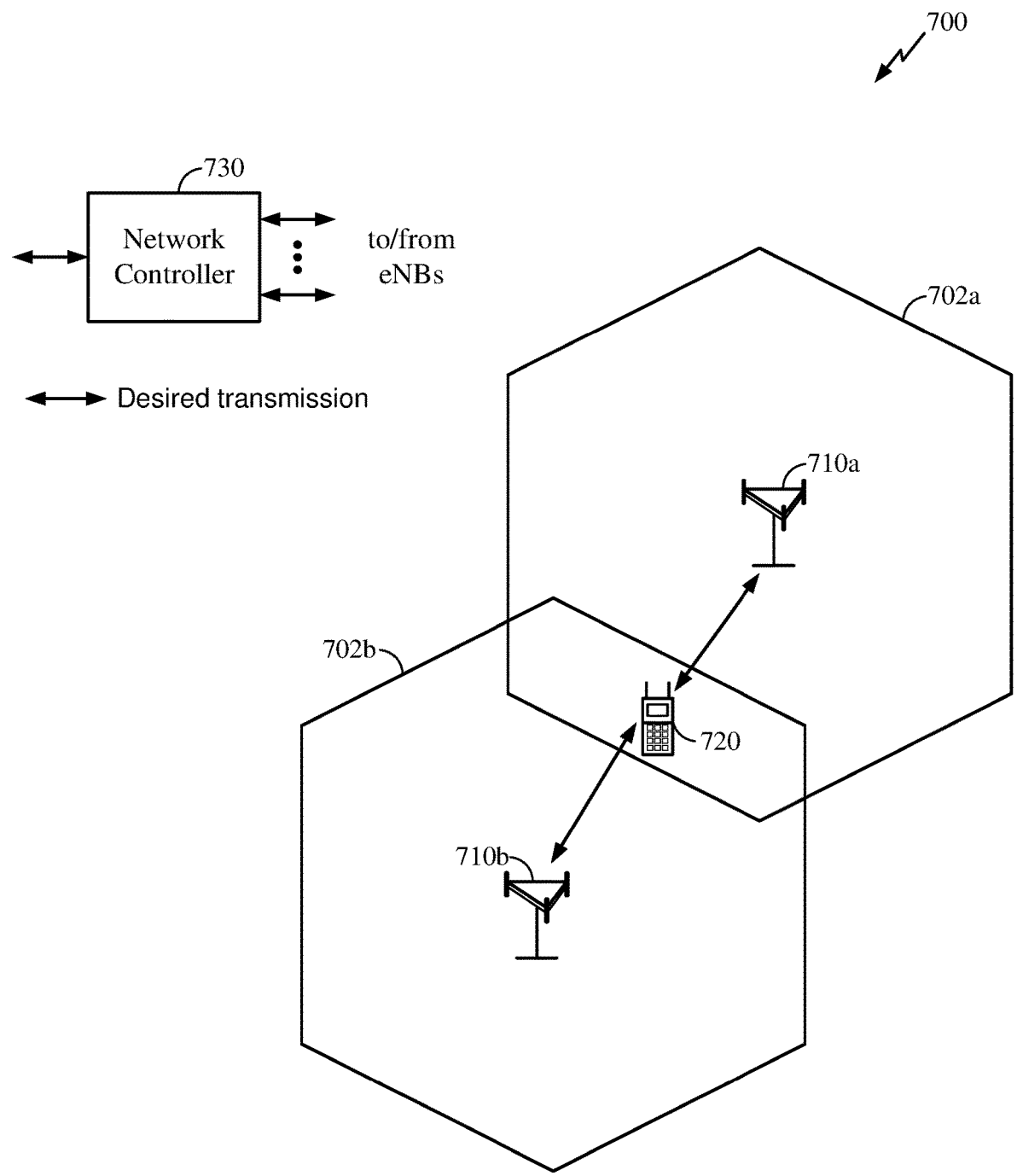
FIG. 7 illustrates a dual connectivity scenario in accordance with certain aspects of the present disclosure.

FIG. 7 illustrates a dual connectivity scenario 700 in accordance with certain aspects of the present disclosure. As shown in FIG. 7, UE 720 is within the overlapping portion of the cell edges of cells 702*a* and 702*b* served by eNBs 710*a* and 710*b* respectively. As shown UE 720 may communicate (uplink and downlink) with both eNBs simultaneously using independent data streams to each of the eNBs. By scheduling two independent data streams to the UE from the two different eNodeBs at the same time, dual connectivity exploits uneven loading. This helps improve the cell edge user experience while increasing network capacity. In one example, throughput data speeds for users at a cell edge may double. In an aspect, one or more network controllers 730 may be configured to control the eNBs 710*a* and 710*b* to implement the dual connectivity scenario 700.

Dual connectivity may have benefits in the cellular industry. In an aspect, a dual connectivity solution enables a UE to simultaneously connect to two eNBs, a Master eNB (MeNB) and a secondary eNB (SeNB) which are not co-located. Thus, the different eNBs may use different schedulers, etc. In an aspect, dual connectivity may involve two subsets of serving cells including a Master Cell group (MCG) containing serving cells of the MeNB, and a Secondary Cell Group (SCG) containing serving cells of the SeNB. In general, the term "dual connectivity" may be used to refer to an operation where a given UE consumes radio resources provided by at least two different network points connected with a non-ideal backhaul.

Figure 8:
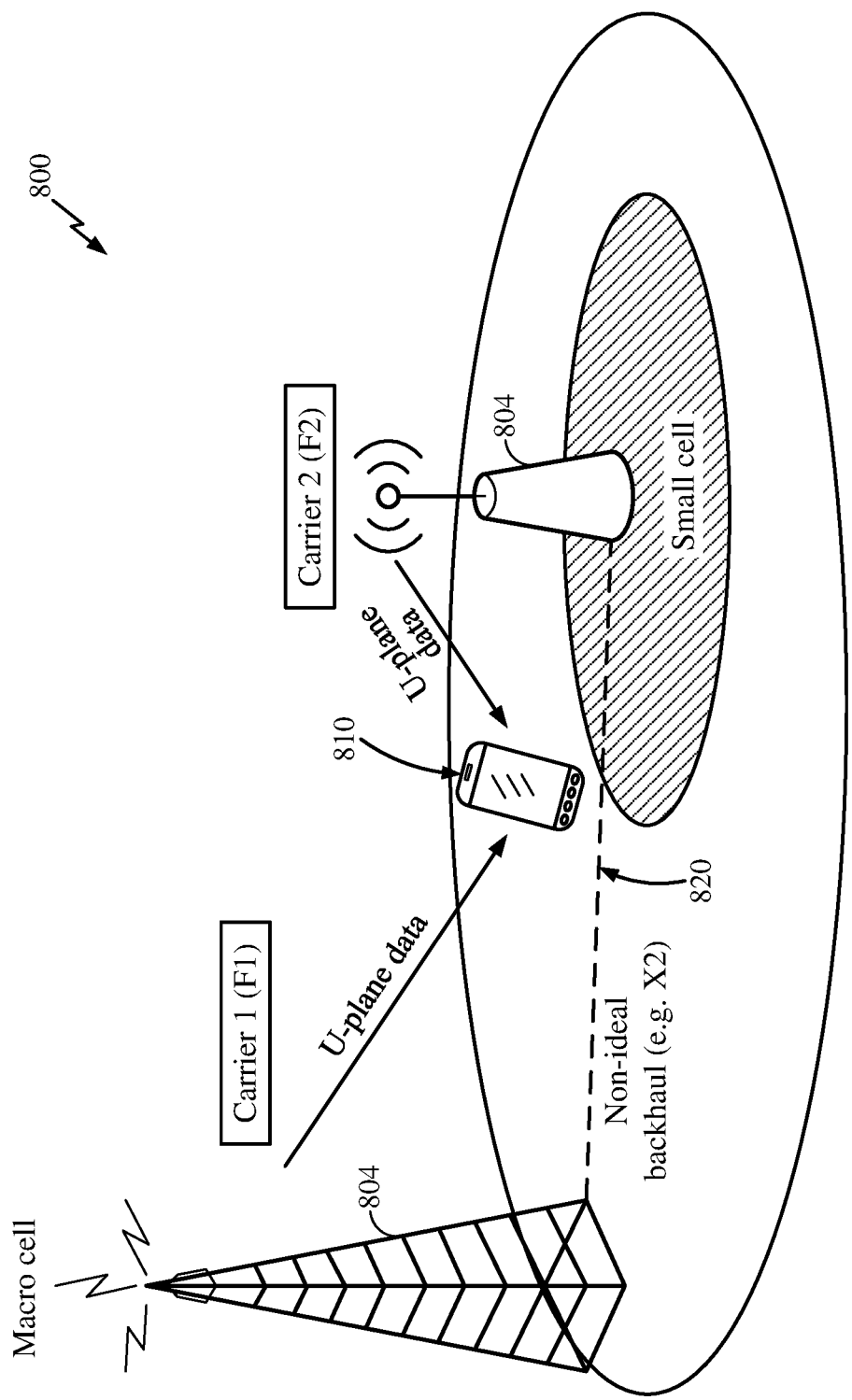
FIG. 8 illustrates a dual connectivity scenario including a macro cell and a small cell communicating with a UE, in accordance with certain aspects of the present disclosure.

FIG. 8 illustrates a dual connectivity scenario 800 including a macro cell and a small cell communicating with a UE, in accordance with certain aspects of the present disclosure. As shown in FIG. 8, the UE 810 may be dually connected to the macro cell 802 and the small cell 804, and the eNBs may be connected via a non-ideal backhaul 820 and may operate on different carrier frequencies. In an aspect, the small cell may include a pico cell, a femto cell, or another macro cell (e.g., with lower power capability).

In certain aspects, inter-node radio resource aggregation may be employed in a dual connectivity scenario for improving per-user throughput. This may be done by aggregating radio resources in more than one eNB for user plane data transmission. For example, carrier aggregation may be employed where multiple LTE/component carriers are aggregated to serve a single unit of LTE Advanced UE. It is envisioned that under dual connectivity a UE may benefit from carrier-aggregation (CA) gains in heterogeneous deployments (where a combination of macro and small cells are used). With carrier aggregation UEs may use spectrum of up to 20 MHz bandwidths up to a total of 100 MHz (5 component carriers) for transmission in each direction. As shown in FIG. 8, Carrier 1 of the macro cell 802 and Carrier 2 of the small cell 804 are aggregated to serve UE 810.

Figure 9:
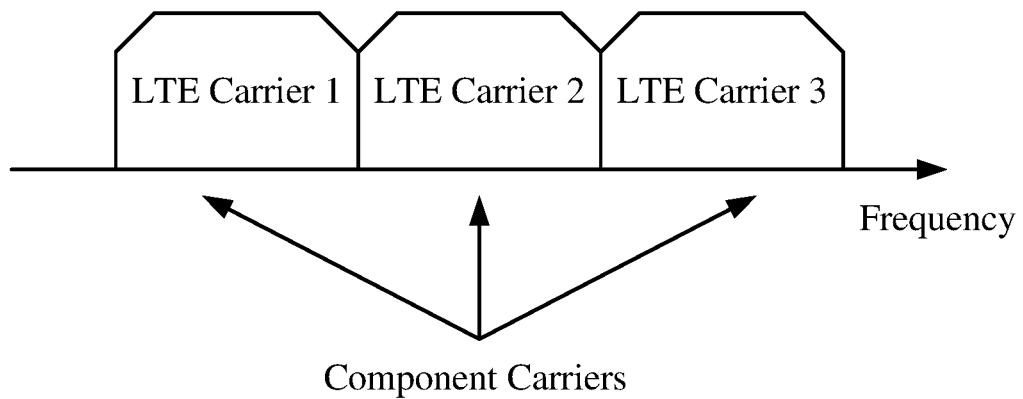
FIG. 9 illustrates continuous carrier aggregation, in accordance with certain aspects of the present disclosure.
Figure 10:
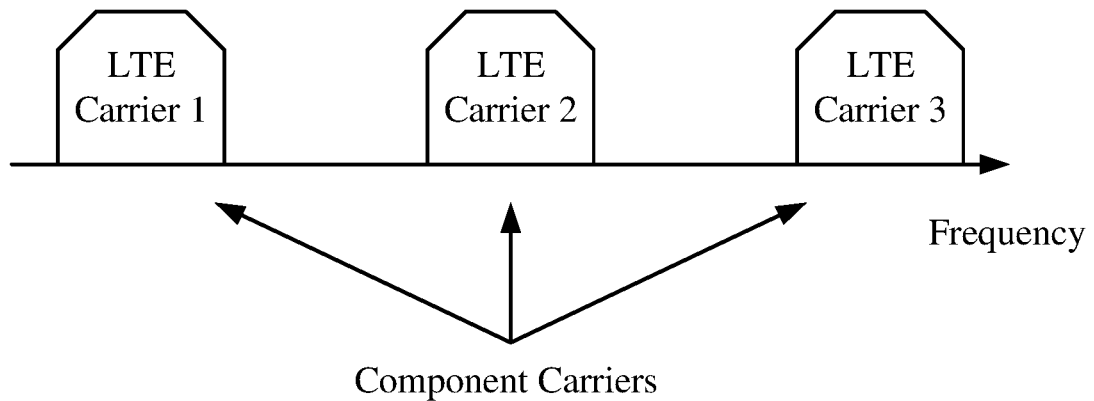
FIG. 10 illustrates non-continuous carrier aggregation, in accordance with certain aspects of the present disclosure.

In certain aspects, two types of carrier aggregation (CA) methods may be employed, continuous CA and non-continuous CA, as illustrated in FIGS. 9 and 10 respectively. Continuous CA occurs when multiple available component carriers are adjacent to each other (FIG. 9). As shown in FIG. 9, LTE carriers 1, 2 and 3 are adjacent to each other may be aggregated for communication between a UE and eNB. On the other hand, non-continuous CA occurs when multiple available component carriers are separated along the frequency band (FIG. 10). As shown in FIG. 10, LTE carriers 1, 2, and 3 are separated along the frequency band and may be aggregated for communication between a UE and eNB.

In certain aspects, a UE operating in a multicarrier system (e.g., using carrier aggregation) is configured to aggregate certain functions of the multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated control channel (DCH), the nonscheduled grants, a physical uplink control channel (PUCCH), and/or a physical downlink control channel (PDCCH).

FIG. 11 illustrates a method 1100 for controlling radio links in a multiple carrier wireless communication system by grouping physical channels, in accordance with certain aspects of the present disclosure. As shown, the method 1100 may include, at block 1102, aggregating control functions from at least two carriers onto one carrier to form a primary carrier and one or more associated secondary carriers. Next at block, 1104, communication links may be established for the primary carrier and each secondary carrier. Then, communication may be controlled based on the primary carrier in block 1106.

In certain aspects, dual connectivity does not introduce a significant change to the C-plane (Control-plane) architecture from the UE perspective. For example, the RRC (Radio Resource Control) messages continue to be transmitted over the MeNB, and, from the UE point of view, there is a single RRC entity.

Figure 12:
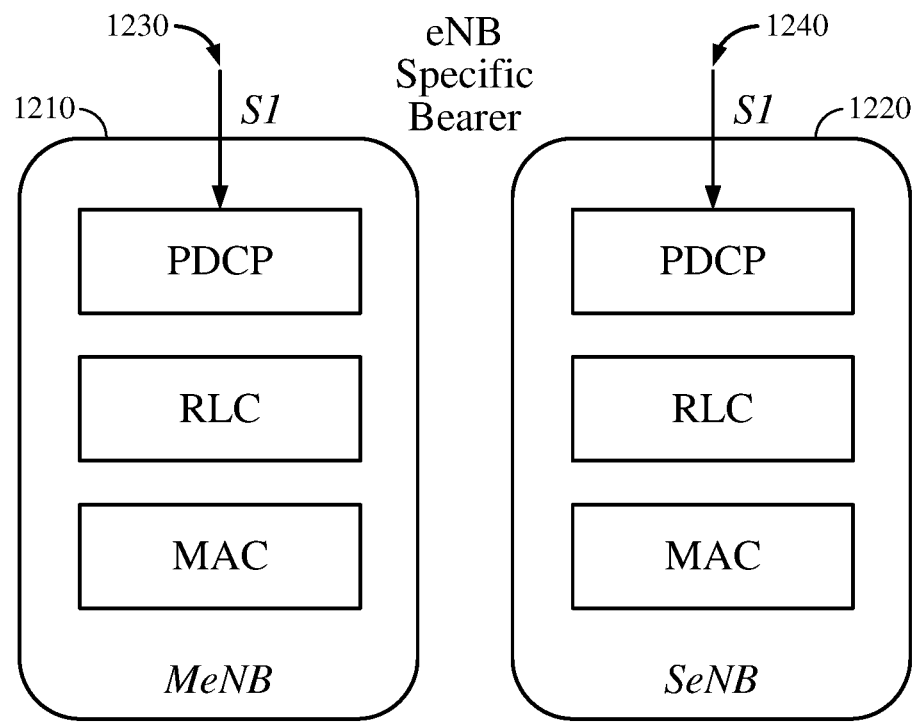
FIG. 12 illustrates a U-plane architecture including eNB specific bearers, in accordance with certain aspects of the present disclosure.
Figure 13:
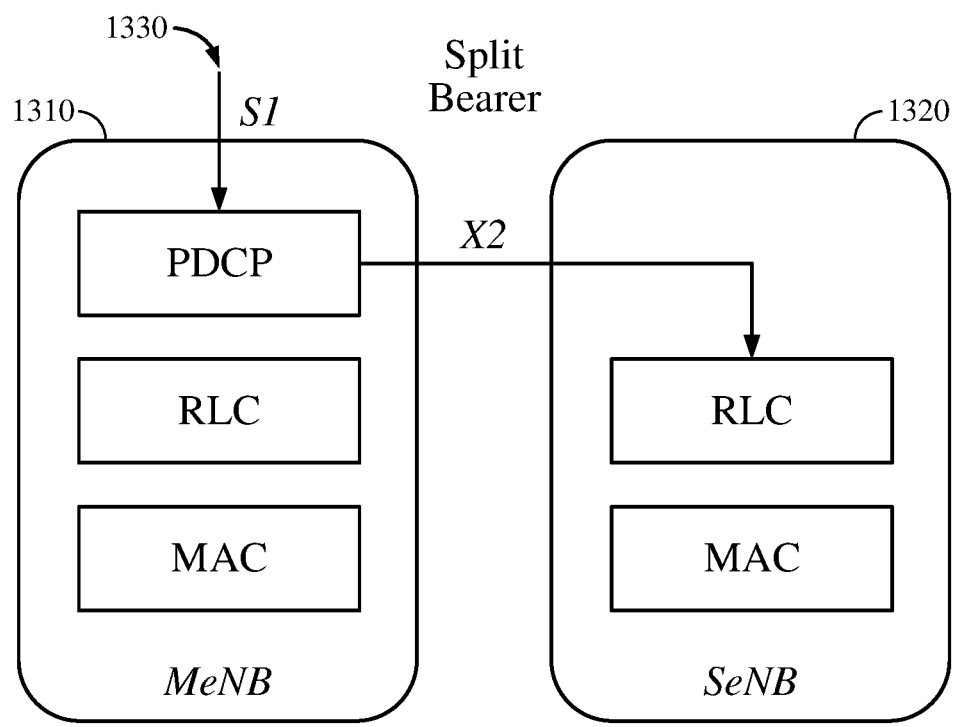
FIG. 13 illustrates an alternative U-plane architecture including a split bearer, in accordance with certain aspects of the present disclosure.

On the other hand, for the U-plane (User-plane), two architectures may be supported for dual connectivity. FIGS. 12 and 13 show two different architectures that may be supported for the U-plane. In a first architecture (shown in FIG. 12) a data radio bearer is eNB-specific, and may be served by the MeNB or SeNB, but not both. When served by the SeNB, this type of bearer may be referred to as SCG bearer. As shown in FIG. 12, bearer 1230 may be served only by the MeNB 1210 and bearer 1240 may only be served by SeNB 1220.

An alternative U-plane architecture (shown in FIG. 13) enables a bearer to be served by both eNBs. This type of bearer may be referred to as a split bearer. As shown in FIG. 13, split bearer 1330 may be served both by the MeNB 1310 and the SeNB 1320. In certain aspects, a bearer establishes a "virtual" connection between two endpoints so that traffic can be sent between them. The bearer acts as a pipeline between the two endpoints.

In certain aspects, due to the distributed nature of the dual connectivity deployment scenario (separate eNBs connected via a non-ideal backhaul) separate uplink control channels for both eNBs (MeNB and SeNB) is used to support distributed scheduling and independent MAC (Medium Access Control) operation across the eNBs. This is unlike CA (Carrier Aggregation) deployment, in which a single MAC/scheduling entity operates across all the carriers and a single uplink control channel is used.

In the current LTE specification, the Primary Cell (PCell of MeNB) is the only cell carrying the uplink control channels, e.g., the PUCCH. For dual connectivity, a special cell on the SeNB, Primary Secondary Cell (SpCell), is introduced in order to support the uplink control channels for the SeNB. Also, with dual connectivity, uplink control channels for both the MeNB and the SeNB are used, one for each eNB. In certain aspects, the presence of an uplink control channel for the SeNB motivates the use for an SCG Radio Link Monitoring (S-RLM) procedure. This procedure may be used by the UE to trigger SeNB Radio Link Failure (S-RLF or SCG RLF). The S-RLF procedure is useful, among other things, to trigger procedures that prevent a UE from jamming the uplink control channels when it loses radio connection to an SeNB. Another reason a special RLF procedure (e.g., S-RLF) may be used for the SeNB is that the MeNB may experience different channel conditions than the SeNB.

In certain aspects, unlike the legacy RLF procedure, the S-RLF does not necessarily involve loss of RRC connection since RRC is over the MeNB and the connection to the MeNB may remain. Hence, certain C-Plane procedures (such as RRC Connection Reestablishment) may not be applicable under S-RLF.

Aspects of the present disclosure discuss several procedures involved in the detection, indication and recovery from S-RLF.

In certain aspects, the S-RLM procedures like the RLM procedures are on the special cell of the SeNB, the SpCell. The Spcell may carry the UL control (in the PUCCH) for the SeNB. It may be noted that any supplementary carriers of the SeNB may not have associated RLM procedures.

In certain aspects, the S-RLF procedure may include S-RLF detection, S-RLF indication, and at least one of S-RLF recovery or SeNB release including bearer fallback upon S-RLF.

In S-RLF detection, the UE or SeNB may determine that the link to the SpCell has undergone RLF based on one or more criteria discussed below. In S-RLF indication, the UE or SeNB may indicate to the MeNB that the SpCell has undergone RLF. The indication may be sent to the MeNB over the backhaul by the SeNB or over RRC or MAC messaging by the UE as described below.

Once the S-RLF has been detected and indicated to the MeNB, there may be two different approaches to manage the S-RLF. A first alternative may include S-RLF recovery, where the UE may re-establish the SeNB connection. In an aspect, the re-establishment may be configured by the MeNB or performed autonomously by the UE as described below. A second alternative may include SeNB release, for example, in cases where the SeNB connection may not be re-established. According to this alternative, the SeNB link is released by the MeNB. In this alternative, e.g., for a split bearer architecture shown in FIG. 13, bearer fallback may be implemented where the traffic may be served exclusively by the MeNB concurrently with the SeNB release. After the SeNB release, all bearers may be served by the MeNB as described below. In an aspect, even if there is no explicit SeNB release upon S-RLF (i.e., the SeNB remains configured), the split bearer (see FIG. 13) may continue to be served by the MeNB.

FIG. 14 illustrates example operations 1400 performed, for example, by a UE, in accordance with certain aspects of the present disclosure. Operations 1400 may begin at 1402 by establishing communication with a MeNB and a SeNB. At 1404, the UE may detect an RLF of a connection with the SeNB, for example, by detecting one or more of Random Access failure on the SeNB, measured radio link quality (e.g., downlink quality) degradation of a link with the SeNB below a threshold resulting in high control channel error probability, RLC re-transmission failures for bearers served by the SeNB, RLF on the MeNB link, SeNB handover (or change) failure, or detecting loss of synchronization with the SeNB. At 1406, the UE may transmit an indication of the SCG RLF to the MeNB, in response to the detection, for example, by at least one of transmitting an S-RLF indication RRC message or MAC message, triggering and transmitting a measurement report on radio link quality conditions in one or more cells of the SeNB, or triggering and transmitting a PDCP (packet data convergence protocol) status report. In an aspect, the S-RLF indication message contains a measurement report regarding one or more cells of the SeNB. At 1408, the UE may continue to monitor, measure, and report the SeNB radio link quality. At 1410, the UE may, upon detection of improved radio conditions, perform a random access procedure on the SeNB. At 1412, the UE may re-establish connection with the SeNB.

FIG. 15 illustrates example operations 1500 performed, for example, by a MeNB, in accordance with certain aspects of the present disclosure. Operations 1500 may begin at 1502 by establishing a first connection with a UE. At 1504, the MeNB may configure the UE to establish a second connection with a SeNB, for example, including configuring the UE to periodically report SeNB measurements. In an aspect, the configuring may include the MeNB sending configuration parameters for the S-RLF to the UE. At 1506, the MeNB may receive an indication of a RLF of the second connection with the SeNB, for example, including receiving a report where the measured received signal for the SeNB is below a certain threshold. At 1508, the MeNB may take at least one action to manage the RLF, in response to receiving the indication of the RLF. As noted above, the one or more actions may include S-RLF recovery or SeNB release including bearer fallback. In an aspect, the one or more actions may include transmitting a reconfiguration command to the UE, including at least one of SeNB release, SeNB add (e.g., another SeNB), SeNB modify (e.g., modify transmit power, data rate or other parameters), or data fallback. At 1510, the MeNB may perform data fallback if the SeNB is released.

FIG. 16 illustrates example operations 1600 performed, for example, by a SeNB, in accordance with certain aspects of the present disclosure. Operations 1600 may being at 1602 by establishing communication with a MeNB and a UE. At 1604, the SeNB may detect an RLF of a connection with the UE, for example, by monitoring the UE's uplink transmissions for the SeNB and detecting when the received energy of the uplink transmissions fall below a threshold. In an aspect, this detection may include monitoring the UE's uplink transmissions for the SeNB and detecting when the received energy of the uplink transmissions falls below a threshold. At 1606, the SeNB may transmit an indication of the RLF to the MeNB over a backhaul connection, in response to the detection.

S-RLF Detection

In certain aspects, a UE connected to a SeNB may detect S-RLF in several ways including one or more of Random Access failure on SeNB, measured radio link quality (e.g., downlink quality) degradation of a link with the SeNB below a threshold resulting in high control channel error probability, RLC (Radio Link Control) retransmission failures, RLF on the MeNB link, SeNB handover (or change) failure, or detecting loss of synchronization with the SeNB.

The SeNB may detect S-RLF for a connected UE by monitoring its uplink transmissions (e.g., control channels, Sounding Reference Signal (SRS), etc.) and by determining that received energy (or signal-to-noise ratio) of the transmissions is below a minimum threshold level.

As an alternative example, the MeNB may detect S-RLF by configuring the UE to report SeNB measurements (e.g. periodically) and by receiving a report where the measured received signal for the SeNB is below a certain threshold.

In certain aspects, upon S-RLF detection the UE stops all uplink transmissions and/or stops decoding on all downlink data and control channels.

S-RLF Indication

A UE connected to an SeNB and MeNB and undergoing S-RLF (but not RLF on MeNB) may indicate S-RLF to MeNB by at least one of transmitting an S-RLF indication RRC message or MAC message, triggering and transmitting a measurement report on radio link quality conditions in one or more cells of the SeNB, or triggering and transmitting a PDCP (Packet Data Convergence Protocol) status report. In an aspect, the SeNB, upon detection of S-RLF of a UE may indicate S-RLF to MeNB by transmitting information indicating S-RLF over the backhaul to the MeNB.

S-RLF Recovery—S-RLF Autonomous Recovery

In certain aspects, the UE may remain configured with SeNB upon S-RLF detection, until de-configured by SeNB via SeNB release procedure. After S-RLF detection and while still configured with SeNB, the UE experiencing S-RLF may continue to monitor the SeNB radio link quality to potentially resume data transmission to the SeNB. Upon detection of improved radio condition (e.g., SeNB SNR>threshold) the UE in S-RLF may perform a Random Access Procedure on the SeNB without being signaled by the MeNB. Upon successful completion of the Random Access on SeNB, the UE may re-establish connection with the SeNB and may indicate S-RLF recovery to the MeNB via an RRC or MAC message.

S-RLF Recovery—S-RLF Network-Assisted Recovery

As noted above, the UE may remain configured with SeNB upon S-RLF detection, until de-configured by SeNB via SeNB release procedure. After S-RLF detection and while still configured with SeNB, the UE experiencing S-RLF may continue to measure and report, e.g., periodically or at configured times, the SeNB radio link quality to the MeNB. Upon reception of a report from the UE indicating suitable radio link quality between the UE and the SeNB, the MeNB may signal the UE to perform a Random Access Procedure on the SeNB to re-establish connection with the SeNB.

In an aspect, after detecting the S-RLF, the UE may continue to monitor and measure the radio link quality with the SeNB. Upon detection of a recovery of the radio link with the SeNB, for example upon detecting the quality above a threshold quality, the UE may transmit an indication of the recovery to the MeNB. In response, the MeNB may transmit a S-RLF recovery command to the UE including instructions for re-establishing connection with the SeNB. For example, the S-RLF recovery command may include instructions to perform Random Access with the SeNB. In an aspect, the indication of recovery transmitted to the MeNB may include a S-RLF recovery message or a measurement report regarding the SeNB.

SeNB Release and Bearer Fallback Upon S-RLF

In certain aspects, upon receiving an S-RLF indication, the MeNB may initiate a SeNB release procedure with the UE in which the bearers connected to the SeNB are removed. In an aspect, concurrent with the release procedure, the MeNB may perform a data bearer fallback, consisting of resuming data communication on MeNB only, for at least one bearer (or data flow) that is served by MeNB and SeNB simultaneously. In an aspect, data bearer fallback may not require reconfiguration of PDCP. This fallback may be done because in the alternative U-plane architecture a bearer may be served by both eNBs (see FIG. 13).

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communication by a user equipment (UE), comprising:
    establishing dual-connectivity communication with a master base station and a secondary base station;
    detecting radio link failure (RLF) of a connection with the secondary base station;
    transmitting an indication of the RLF to the master base station; and
    receiving a reconfiguration command from the master base station after transmitting the indication of the RLF, wherein the reconfiguration command comprises a command for data fallback including resuming data communication with the master base station on at least one bearer previously established with the secondary base station and simultaneously served by both the master base station and the secondary base station, wherein resuming data communication with the master base station for the data fallback is performed without a PDCP (Packet Data Convergence Protocol) re-configuration of the at least one bearer.

2. The method of claim 1, further comprising:
    releasing one or more bearers served only by the secondary base station in response to a communication by the master base station.

3. The method of claim 1, wherein the at least one bearer comprises a split-bearer and wherein the split-bearer continues to be served by the master base station following the RLF of the connection with the secondary base station.

4. The method of claim 1, wherein transmitting the indication of the RLF comprises transmitting at least one of a Secondary-RLF (S-RLF) indication message, or transmitting a measurement report regarding one or more cells of the secondary base station.

5. The method of claim 1, wherein the UE remains configured with the secondary base station in the dual-connectivity communication until de-configured.

6. The method of claim 1, wherein detecting RLF of the connection with the secondary base station comprises at least one of:
    detecting a random access failure on the secondary base station,
    detecting a degradation of radio link quality with the secondary base station,
    detecting one or more RLC retransmission failures with the secondary base station,
    detecting a loss of synchronization with the secondary base station, or
    detecting a handover failure with the secondary base station.

7. The method of claim 1, wherein transmitting the indication of the RLF comprises transmitting a radio resource control (RRC) message or a medium access control (MAC) message.

8. The method of claim 1, wherein transmitting the indication of the RLF comprises transmitting a measurement report with information about a radio link quality of the connection with the secondary base station.

9. The method of claim 1, further comprising suspending communication with the secondary base station in response to detecting the RLF.

10. The method of claim 1, further comprising:
    continuing to monitor radio link quality with the secondary base station after detecting the RLF; and
    detecting recovery of a radio link with the secondary base station.

11. The method of claim 10, wherein detecting recovery of the radio link comprises determining that a measured downlink signal from the secondary base station exceeds a threshold value.

12. The method of claim 10, further comprising:
    re-establishing communication with the secondary base station, in response to detecting the recovery of the radio link, by performing a random access procedure.

13. A method of wireless communication performed by a master base station, comprising:
    establishing dual-connectivity communication with a user equipment (UE) and a secondary base station;
    receiving, from the UE, an indication of a radio link failure with the secondary base station; and
    transmitting, to the UE, a reconfiguration command comprising a command for data fallback including resuming data communication with the master base station on at least one bearer previously established with the secondary base station and simultaneously served by the master base station and the secondary base station, wherein resuming data communication with the master base station for the data fallback is performed without a PDCP (Packet Data Convergence Protocol) re-configuration of the at least one bearer.

14. The method of claim 13, wherein the reconfiguration command comprises a command to release one or more bearers previously established with the secondary base station.

15. The method of claim 13, wherein the at least one bearer comprises a split-bearer and wherein the split-bearer continues to be served by the master base station following the RLF of the connection with the secondary base station.

16. The method of claim 13, wherein the indication of the RLF comprises at least one of a Secondary-RLF (S-RLF) indication message, or a measurement report regarding one or more cells of the secondary base station.

17. The method of claim 13, wherein the indication of the RLF comprises a radio resource control (RRC) message or a medium access control (MAC) message.

18. The method of claim 13, wherein the indication of the RLF comprises a measurement report with information about a radio link quality of a connection with the secondary base station.

19. The method of claim 13, further comprising:
    transmitting a command to the UE including instructions for reestablishing communication with the secondary base station.

20. The method of claim 19, wherein the instructions for reestablishing communication with the secondary base station instruct the UE to perform a random access procedure with the secondary base station.

21. An apparatus for wireless communication, comprising:
at least one processor configured to:
establish dual-connectivity communication with a master base station and a secondary base station;
detect radio link failure (RLF) of a connection with the secondary base station;
transmit an indication of the RLF to the master base station; and
receive a reconfiguration command from the master base station after transmitting the indication of the RLF, wherein the reconfiguration command comprises a command for data fallback including resuming data communication with the master base station on at least one bearer previously established with the secondary base station and simultaneously served by both the master base station and the secondary base station, wherein resuming data communication with the master base station for the data fallback is performed without a PDCP (Packet Data Convergence Protocol) re-configuration of the at least one bearer; and
a memory coupled to the at least one processor.

22. The apparatus of claim 21, wherein the at least one bearer comprises a split-bearer and wherein the split-bearer continues to be served by the master base station following the RLF of the connection with the secondary base station.

23. The apparatus of claim 21, wherein transmitting the indication of the RLF comprises transmitting at least one of a Secondary-RLF (S-RLF) indication message, or transmitting a measurement report regarding one or more cells of the secondary base station.

24. The apparatus of claim 21, wherein transmitting the indication of the RLF comprises transmitting a radio resource control (RRC) message or a medium access control (MAC) message.

25. The apparatus of claim 21, wherein the at least one processor is further configured to suspend communication with the secondary base station in response to detecting the RLF.

26. The apparatus of claim 21, wherein the at least one processor is further configured to:
continue to monitor radio link quality with the secondary base station after detecting the RLF; and
detect recovery of a radio link with the secondary base station.

27. An apparatus for wireless communication, comprising:
at least one processor configured to:
establish dual-connectivity communication with a user equipment (UE) and a secondary base station;
receive, from the UE, an indication of a radio link failure with the secondary base station;
transmit, to the UE, a reconfiguration command comprising a command for data fallback including resuming data communication with the apparatus on at least one bearer previously established with the secondary base station and simultaneously served by the apparatus and the secondary base station, wherein resuming data communication for the data fallback is performed without a PDCP (Packet Data Convergence Protocol) re-configuration of the at least one bearer; and
a memory coupled to the at least one processor.

28. The apparatus of claim 27, wherein the reconfiguration command comprises a command to release one or more bearers previously established with the secondary base station.

29. The apparatus of claim 27, wherein the at least one bearer comprises a split-bearer and wherein the split-bearer continues to be served by the apparatus following the RLF of the connection with the secondary base station.

30. The apparatus of claim 27, wherein the indication of the RLF comprises at least one of a Secondary-RLF (S-RLF) indication message, or a measurement report regarding one or more cells of the secondary base station.

* * * * *